(12) United States Patent
Hurley

(10) Patent No.: US 10,466,386 B2
(45) Date of Patent: Nov. 5, 2019

(54) METHODS FOR DETERMINING A SATURATION-HEIGHT FUNCTION IN OIL AND GAS RESERVOIRS

(71) Applicant: SCHLUMBERGER TECHNOLOGY CORPORATION, Sugar Land, TX (US)

(72) Inventor: Neil F. Hurley, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 241 days.

(21) Appl. No.: 14/910,492

(22) PCT Filed: Aug. 8, 2014

(86) PCT No.: PCT/US2014/049846
§ 371 (c)(1),
(2) Date: Feb. 5, 2016

(87) PCT Pub. No.: WO2015/021088
PCT Pub. Date: Feb. 12, 2015

(65) Prior Publication Data
US 2016/0187532 A1   Jun. 30, 2016

Related U.S. Application Data

(60) Provisional application No. 61/862,675, filed on Aug. 6, 2013.

(51) Int. Cl.
*G01V 11/00* (2006.01)
*E21B 49/02* (2006.01)
*E21B 25/00* (2006.01)

(52) U.S. Cl.
CPC ............ *G01V 11/002* (2013.01); *E21B 25/00* (2013.01); *E21B 49/02* (2013.01)

(58) Field of Classification Search
None
See application file for complete search history.

(56) References Cited

U.S. PATENT DOCUMENTS 5,193,059 A * 3/1993 Tiab ................. G01N 15/08
702/12
6,147,489 A * 11/2000 Freedman ........... G01N 24/081
324/303

(Continued)

FOREIGN PATENT DOCUMENTS

EP   2006702 A2   12/2008

OTHER PUBLICATIONS

Al Ibrahim, M., et al., "An Automated Petrographic Image Analysis System: Capillary Pressure Curves Using Confocal Microscopy", SPE preprint 159180, presented at the SPE Annual Technical Conference and Exhibition, San Antonio, Texas, USA, 2012, 21 pages.

(Continued)

*Primary Examiner* — Michael Lebentritt

(57) ABSTRACT

Saturation-height functions in oil and gas reservoirs are determined using methods that include quantifying the microporosity of the subterranean formation; determining the distribution of facies and microporosity as a function of depth; and calculating the saturation-height function for a given formation.

19 Claims, 6 Drawing Sheets

(56) References Cited

U.S. PATENT DOCUMENTS

| | | | |
|---|---|---|---|
| 6,484,102 B1 | 11/2002 | Holmes | |
| 6,792,354 B1* | 9/2004 | O'Meara, Jr. | G01V 1/50 |
| | | | 702/13 |
| 7,054,749 B1* | 5/2006 | O'Meara, Jr. | G01V 1/50 |
| | | | 702/13 |
| 7,490,028 B2* | 2/2009 | Sayers | E21B 21/08 |
| | | | 166/255.1 |
| 9,581,723 B2* | 2/2017 | Hurley | G01V 11/00 |
| 2009/0103677 A1* | 4/2009 | Wood | G01N 23/046 |
| | | | 378/53 |
| 2009/0189604 A1* | 7/2009 | Romero | G01N 24/081 |
| | | | 324/303 |
| 2009/0228249 A1 | 9/2009 | Green | |
| 2009/0254281 A1* | 10/2009 | Hruska | G01V 11/00 |
| | | | 702/7 |
| 2011/0004447 A1 | 1/2011 | Hurley et al. | |
| 2012/0035851 A1* | 2/2012 | Romero | G01V 3/32 |
| | | | 702/8 |
| 2012/0130639 A1* | 5/2012 | Hanson | E21B 49/00 |
| | | | 702/2 |
| 2012/0221306 A1* | 8/2012 | Hurley | G01V 99/005 |
| | | | 703/6 |
| 2012/0275658 A1* | 11/2012 | Hurley | G06T 7/0004 |
| | | | 382/109 |
| 2012/0281883 A1* | 11/2012 | Hurley | G01N 21/6458 |
| | | | 382/109 |
| 2013/0270011 A1* | 10/2013 | Akkurt | E21B 49/088 |
| | | | 175/58 |
| 2013/0297272 A1* | 11/2013 | Sung | G01V 1/306 |
| | | | 703/10 |
| 2014/0048694 A1* | 2/2014 | Pomerantz | G01V 11/00 |
| | | | 250/255 |
| 2015/0134255 A1* | 5/2015 | Zhang | G01V 1/40 |
| | | | 702/7 |
| 2015/0355158 A1* | 12/2015 | Lander | G01N 33/24 |
| | | | 702/2 |
| 2016/0124116 A1* | 5/2016 | Souche | G01V 99/005 |
| | | | 703/2 |
| 2016/0328419 A1* | 11/2016 | Safonov | E21B 49/00 |
| 2017/0016812 A1* | 1/2017 | Liu | G01N 15/0826 |
| 2017/0032532 A1* | 2/2017 | Andersen | E21B 49/02 |
| 2017/0267909 A1* | 9/2017 | Jin | C09K 8/035 |

OTHER PUBLICATIONS

Anselmetti, F. S. et al., "Quantitative Characterization of Carbonate Pore Systems by Digital Image Analysis", AAPG Bulletin, 1998, 82(10), pp. 1815-1836.

Archie, G. E.,"Electrical Resistivity Log as an Aid in Determining Some Reservoir Characteristics", Transactions of AIME, 1942, 146, pp. 54-67.

Asquith, G. B.,"Log Evaluation of Shaly Sandstones: A Practical Guide", AAPG Continuing Education Course Note Series, 1991, #31, 59 pages.

Boyd, A. et al., "The Lowdown on Low-Resistivity Pay", Oilfield Review, 1005. 7(3), pp. 4-18, 1995.

Buiting, J. J. M., "Upscaling Saturation-Height Technology for Arab Carbonates for Improved Transition-Zone Characterization", SPE Reservoir Evaluation and Engineering, Feb. 2011, pp. 11-24.

Cantrell, D. L., et al., "Microporosity in Arab Formation Carbonates, Saudi Arabia", GeoArabia, 1999, 4(2), pp. 129-154.

Choquette, P. W. et al., "Geologic Nomenclature and Classification of Porosity in Sedimentary Carbonates", AAPG Bulletin, 1970, 54(2), pp. 207-250.

Clerke, E. A. et al., "Application of Thomeer Hyperbolas to Decode the Pore Systems, Facies and Reservoir Properties of the Upper Jurassic Arab D Limestone, Ghawar Field, Saudi Arabia: A "Rosetta Stone" Approach", GeoArabia, 2008, 3, pp. 113-160.

Gomaa, N. et al., "Case Study of Permeability, Vug Quantification and Rock Typing in a Complex Carbonate", SPE 102888, presented at the SPE Annual Technical Conference and Exhibition, San Antonio, Texas, USA, 2006, 11 pages.

Hartmann, D. J. et al., "Predicting Reservoir System Quality and Performance" in Beaumont E. A. and N.H. Foster, eds., AAPG Treatise of Petroleum Geology/Handbook of Petroleum Geology: Exploring for Oil and Gas Traps, 1999, pp. 9-1 to 9-154.

Hassall, J. K. et al., Comparison of Permeability Predictors from NMR, Formation Image and Other Logs in a Carbonate Reservoir, SPE preprint 88683, presented at the 12th Abu Dhabi International Petroleum Exhibition and Conference, Abu Dhabi, U.A.E., Oct. 2004, 13 pages.

Hurley, N. F. et al., "Multiscale Workflow for Reservoir Simulation", presented at the SPWLA 53rd Annual Logging Symposium, Cartagena, Colombia, Jun. 2012, 15 pages.

Volery, C. et al., "Shallow-Marine Microporous Carbonate Reservoir Rocks in the Middle East: Relationship with Seawater Mg/Ca Ratio and Eustatic Sea Level", Journal of Petroleum Geology, 2009, 32(4), pp. 313-326.

Lucia, F. J., "Rock-Fabric/Petrophysical Classification of Carbonate Pore Space for Reservoir Characterization", AAPG Bulletin, 1995, 79(9), pp. 1275-1300.

Marzouk, I. et al., "Geologic Controls on Wettability of Carbonate Reservoirs, Abu Dhabi, U.A.E.", SPE preprint 29883, presented at the SPE Middle East Oil Show, Bahrain, 1995, pp. 449-460.

Nurmi, R. et al., "Carbonates—The Inside Story: Middle East Well Evaluation Review", Schlumberger Inc., 1997, 18, pp. 26-41.

Pittman, E. D., "Microporosity in Carbonate Rocks", AAPG Bulletin, 1971, 55(10), pp. 1873-1881.

Ramamoorthy, R. et al., "A New Workflow for Petrophysical and Textural Evaluation of Carbonate Reservoirs", Paper B presented at the SPWLA 49th Annual Logging Symposium, Edinburgh, Scotland, 2008,15 pages.

Schowalter, T. T., "Mechanics of Secondary Hydrocarbon Migration and Entrapment", AAPG Bulletin, 1979, 63, pp. 723-760.

Sneider, R. M. et al., "Comparison of Seal Capacity Determinations: Conventional Cores vs. Cuttings" in Seals, Traps, and the Petroleum System, AAPG Memoir, Surdam, R. C., ed., 1997,67, pp. 1-12.

Thomeer, J. H. M., "Introduction of a Pore Geometrical Factor Defined by the Capillary Pressure Curve", Journal of Petroleum Technology, 1960, 12(3), pp. 73-77.

Vizcarra, E. et al, "Challenges of Saturation Height Modeling in a Low Resistivity, Complex Carbonated Porosity System: The Impact of Microporosity in the Uwainat Member, Bul Hanine Field, Offshore Qatar", IPTC preprint 13578, presented at the International Petroleum Technology Conference held in Doha, Qatar, Dec. 2009, 19 pages.

\* cited by examiner

METHODS FOR DETERMINING A SATURATION-HEIGHT FUNCTION IN OIL AND GAS RESERVOIRS

CROSS REFERENCE TO RELATED APPLICATIONS

This application claims priority to U.S. Provisional Patent Application No. 61/862,675, filed Aug. 6, 2013, entitled "METHODS FOR DETERMINING A SATURATION-HEIGHT FUNCTION IN OIL AND GAS RESERVOIRS", the entire disclosure of which is hereby expressly incorporated by reference herein.

BACKGROUND

Calculating fluid distribution in subterranean reservoirs is one approach to determining whether a given reservoir is a potential hydrocarbon reserve. As hydrocarbon exploration and production moves to methods of enhanced oil recovery and methods that utilize unconventional reservoirs such as complex carbonate formations and shale gas formations, the calculation of the fluid distribution can become more difficult in formations containing heterogeneous rock types and variations in porosity.

One method of characterizing fluid distributions within a formation includes the volumetric calculation of the hydrocarbons in place using a water saturation-height function. Water saturation-height functions can be determined using porosity data and water saturation values from well logs and/or core sample characterization. However, in some formations, variations in pore geometry may negatively affect the predictability of petrophysical properties using such techniques, particularly where the saturation-height functions assume a homogenous formation having little or no variability of pore size or pore connectivity.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, the present disclosure is directed to methods for determining a saturation-height function for a subterranean formation that include quantifying the microporosity of the subterranean formation from one or more core samples; determining the distribution of facies and microporosity as a function of depth; and calculating the saturation-height function.

In another aspect, the present disclosure is directed to methods of determining a saturation-height function for a subterranean formation that include: obtaining at least one core sample of the subterranean formation; classifying at least one core sample in terms of variation in at least one of facies, porosity, and permeability; analyzing the at least one core sample to quantify at least one of absolute values of microporosity, pore-body size distributions, pore-throat size distributions, and synthetic capillary pressure curves; computing a numerical special core analysis from a digital model generated from the at least one of absolute values of microporosity, pore-body size distributions, pore-throat size distributions, and synthetic capillary pressure curves; obtaining at least one mercury injection capillary pressure (MICP) measurement from the at least one core sample; analyzing the at least one mercury injection capillary pressure measurement using Thomeer hyperbola; obtaining at least one nuclear magnetic resonance (NMR) log for the subterranean measurement; calibrating the at least one nuclear magnetic resonance log using porosity values determined from the analysis of the at least one core sample and the at least one mercury injection capillary pressure measurement; determining a microporosity-weighted water saturation; and calculating the saturation height of the subterranean formation.

Other aspects and advantages of the invention will be apparent from the following description and the appended claims.

BRIEF DESCRIPTION OF DRAWINGS

The subject disclosure is further described in the detailed description which follows, in reference to the noted plurality of drawings by way of non-limiting examples of the subject disclosure, in which like reference numerals represent similar parts throughout the several views of the drawings, and wherein.

DETAILED DESCRIPTION

Figure 1:
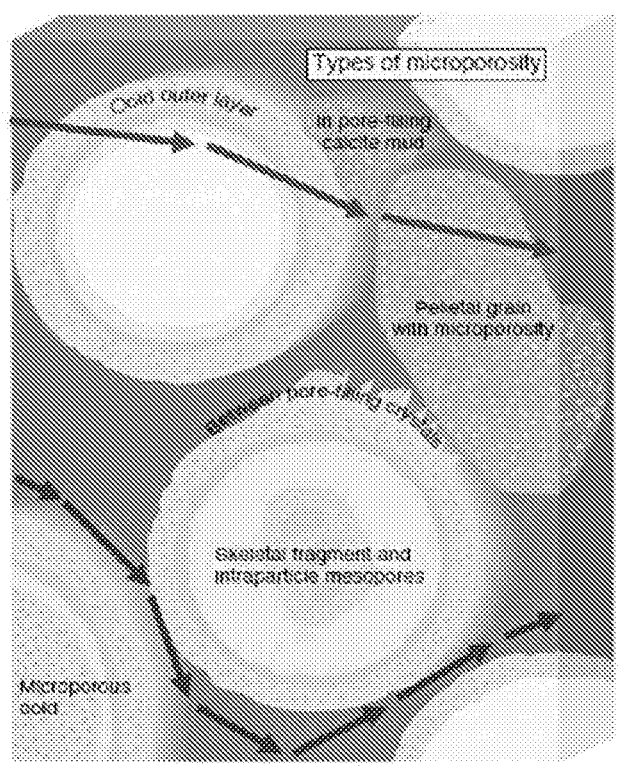
FIG. 1 illustrates a schematic view of microporosity in carbonate sedimentary grains.

This subject disclosure relates to computing water saturation ($S_w$) values using saturation-height functions determined from rock-based and/or log-based techniques. The particulars shown herein are by way of example and for purposes of illustrative discussion of the examples of the subject disclosure only and are presented in the cause of providing what is believed to be the most useful and readily understood description of the principles and conceptual aspects of the subject disclosure. In this regard, no attempt is made to show structural details in more detail than is necessary, the description taken with the drawings making apparent to those skilled in the art how the several forms of the subject disclosure may be embodied in practice. Furthermore, like reference numbers and designations in the various drawings indicate like elements.

Often resistivity measurements are used in the field of hydrocarbon exploration as a means for detecting viable hydrocarbon reserves. Resistivity tools are used to delineate hydrocarbons from saline water within pore spaces of earth formation penetrated by the borehole. The basic principal underlying the measurement is that, for a given formation matrix, the formation containing more resistive hydrocarbon fluid within the pore space will exhibit a greater composite resistivity than the same formation containing less resistive saline liquid within the pore space.

However, while hydrocarbon-containing formations are often thought to have higher resistivity measurements relative to water-bearing formations, many carbonate, sandstone, and shale reservoirs produce oil and gas from microporous and clay-bearing rocks that often have low electrical resistivity. Low-resistivity pay often occurs in reservoirs that have interconnected pore networks that contain relatively small amounts of saline liquid.

Resistive paths are less tortuous when microporosity is interconnected and water bearing, with the net effect that measured deep resistivity ($R_t$) values are too low and computed water saturations ($S_w$) are too high, masking potentially hydrocarbon-rich regions. Low-resistivity pay also occurs in sandstone and shale reservoirs in which abundant clay is mixed with sand and silt grains. The bound water in the clay tends to decrease deep resistivity ($R_t$), which can also yield anamolous $S_w$ values. Other similar structures may be observed in subterranean formations that include lithologies such as coals, evaporites, igneous, and metamorphic rocks.

In such low-resistivity pays, the water saturation as a function of height (saturation-height function) may be used to provide an estimation of the water saturation ($S_w$) in the reservoir for a given height above the free water level (FWL), for a given reservoir permeability or porosity. The saturation-height function is dependent on a number of factors that include the porosity, rock type, and density of the various fluids within the formation.

Each rock and fluid type has unique features that can be determined by laboratory measurements. These features can be matched to field data collected through well logs, cores, borehole images and other well data in order to produce accurate models of the saturation-height function from physical relationships widely known in the art.

The pore spaces inside of rocks are microscopic in many cases, giving capillary forces an effect. For example, pores considered to be micropores may have pore-body diameters of 10 microns or less, and often have pore-throat diameters on the order of 1 micron or less. Capillary pressure reflects the interaction of rock and fluids, and is controlled by the pore geometry, interfacial tension and wettability. Pore density, surface tension, and curvature of the spaces between pores cause fluids of different densities and matrix affinity to have different capillary pressures. In addition, as relative saturation of the particular fluids change, the difference in capillary pressure also changes.

In a hydrocarbon reservoir, the hydrocarbon saturation as a percent of hydrocarbon space will increase upward (as the water saturation decreases) through the hydrocarbon column as the forces of buoyancy overcome the forces of capillary pressure. As hydrocarbon saturation increases, the ability of hydrocarbons to flow to the wellbore increases to the point where water-free production occurs. The interval from water production at the base of the hydrocarbon-saturated reservoir to water-free production higher in the reservoir is termed the hydrocarbon-water transition zone. The thickness of the hydrocarbon-water transition zone is dependent on the capillary properties of the formation and the fluid composition and mobility in the system.

Capillary pressure may be measured using mercury injection, porous plates, or centrifuge-techniques in many cases. However, generating representative capillary pressure curves may be challenging in some formations due to limited data, large variation in rock fabrics as a function of depth, and the use of non-reservoir fluids to obtain the final measurements. In such challenging formations, if pore geometry is known, capillary pressure may be estimated using other techniques such as confocal microscopy and three dimensional modeling.

In one or more embodiments, methods described herein may be used to calculate a saturation-height function using petrophysical models that use porosity measurements obtained from confocal microscopy and/or MICP. In other embodiments, the porosity and water saturation for a formation may be estimated from well logs using established procedures, or a saturation-height function may be derived from well logs calibrated using porosity data to provide an in-situ characterization of $S_w$ in yet other embodiments.

A number of characterization techniques as well as potential workflow arrangements may be used in embodiments of the subject disclosure to produce saturation-height models that account for heterogeneity in the formation, particularly when a given formation contains one or more facies. While further sub combinations are envisioned without materially deviating from this disclosure, four general approaches of generating a saturation-height model are provided: (1) the use of conventional microscopy techniques to identify/verify the presence of facies in borehole imaging logs; (2) the use of conventional microscopy in combination with porosity measurements to calibrate NMR logs; (3) the calibration of NMR log porosity from values obtained from confocal microscopy techniques and/or MICP; and (4) the use of confocal microscopy to determine porosity values, three dimensional models, and special core analyses that may be integrated into a larger petrophysical model, which in turn may be used to generate a saturation-height function.

With particular reference to (1), one or more embodiments of the workflow may include using conventional microscopy of thin sections prepared from one or more core samples to classify the samples in terms of mineralogy, grain type, and dominant facies present in the sampled region of the formation. When correlated with depth, the presence of dominant facies may then be used to resolve facies and bedding patterns in borehole imaging logs that may be used to produce a saturation-height model.

With respect to (2), one or more embodiments of the workflow may include gathering information from conventional microscopy to aid a number of downstream processes including identifying facies in a given section of the formation, which can then be correlated with the porosity determined from techniques such as MICP and/or confocal microscopy in order to partition porosity data. Partitioned data may then be used to design cutoffs or other filtering techniques that may be used to enhance the results from logging techniques including NMR logs as shown or similarly applied to a number of electrical logs, porosity logs, or lithology logs. The enhanced logs may then be converted to saturation data and a saturation-height model using techniques described herein or as known in the art.

With respect to (3), in one or more embodiments of the workflow the information generated from confocal microscopy and/or MICP analysis of core samples or thin sections may be used to determine porosity or other relevant factors in order to partition porosity data in order to calibrate NMR logs or other logs as described in (2).

With respect to (4), in one or more embodiments of the workflow data produced from confocal microscopy may be used to determine porosity values in addition to developing three dimensional models of the pore network in the formation. These models may then be used to generate synthetic capillary curves and other special core analyses that may be integrated into a larger petrophysical model, which produces the final saturation-height function.

Determination of Microporosity

Pore systems are made up of relatively large voids (pores) connected by smaller voids (pore throats). Pore size is typically measured as the diameter of the largest sphere that can fit in a pore, whereas pore-throat size is the diameter of the smallest disk or sphere that can be placed in the throats between pores. For example, complex pore types in carbonate rocks may be described by the following definitions: micropores for pores smaller than 1/16 mm (62.5 microns); mesopores for pores that range in size from 1/16 to 4 mm (62.5 to 4,000 microns); and macropores for pores larger than 4 mm (4,000 microns).

Many geologists consider 62.5 microns to be too large for micropores, and in some cases recommend a 1-micron cutoff. Others propose a cutoff pore diameter of 20 microns, while others propose a pore diameter of 10 microns. Another example includes the classification of microporosity in carbonate rocks and rock fabrics, including a pore size of less than 20 microns.

Engineers and petrophysicists commonly focus on pore-throat diameters. For example, mercury injection capillary pressure data may be used to partition pore throats into macropores (more than 4 microns), mesopores (4-0.3 microns), and micropores (less than 0.3 microns). Others within the field have proposed 5 and 0.5 micron cutoffs between macro-, meso-, and micro-pore throat sizes, respectively. Nuclear magnetic resonance logs have been used to partition porosity into various pore-size categories.

Thomeer functions have been used to discover modes in the maximum pore-throat diameters of 58 microns for Type M macropores and 1.05 microns for Type 1 micropores.

For the purpose of this disclosure, micropores are considered to be those with pore-body diameters of 10 microns or less, and pore-throat diameters on the order of 1 micron or less.

Origin of Microporosity

Some of the most comprehensive work on microporosity in the Middle East is focused on the Arab Formation in Saudi Arabia. Four modes of occurrence of microporosity in the Arab Formation have been documented: (1) microporous grains, (2) microporous matrix, (3) microporous fibrous to bladed cements, and (4) microporous equant cements. Many have concluded that post-depositional leaching of metastable $CaCO_3$ minerals and incomplete reprecipitation of low magnesium calcite is probably responsible for microporosity in micritized microporous grains and matrix. Further, some in the field have doubted that micritization by boring endolithic organisms could be responsible for the pervasive microporous fabrics observed in Arab Formation carbonates.

The dissolution of metastable grains, followed by the incomplete reprecipitation of stable $CaCO_3$ has been described as an early diagenetic process. The following diagenetic scenarios have been proposed: (1) evaporite diagenesis, (2) leaching by carbon dioxide charged fluids formed during maturation and migration of hydrocarbons, (3) marine diagenesis, (4) fresh water vadose diagenesis, (5) fresh water phreatic diagenesis, and (6) mixing zone diagenesis. Based on the above scenarios, it is generally accepted that evaporite-derived waters, undersaturated with respect to calcium, moved through the formation to promote leaching and incomplete reprecipitation of Arab Formation carbonates. Crystal growth contact inhibition probably influenced microporosity development in cement rims on microporous grains.

Some have suggested that carbonates deposited during times of calcitic seas have reduced numbers of metastable grains. In addition, deposits formed during sea-level transgressions and/or highstands did not allow freshwater diagenesis to totally fill the porosity. Although much work is focused on Cretaceous carbonates of the Middle East, many of these criteria may apply to other carbonate rocks.

Microporosity and Low-Resistivity Pay

Low-resistivity pay occurs in carbonates that have abundant microporosity and low water resistivity. Resistive paths are less tortuous when microporosity is interconnected and water bearing. Particularly with respect to FIG. 1, a schematic view of microporosity is illustrated in carbonate sedimentary grains such as skeletal fragments, ooids, pellets, and mud. When the micropores are water saturated (grey dots), electrical current tends to flow through the grains (arrows through the grains), rather than around the grains (arrows around the grains). This results in formation resistivity values that are too low, and computed water saturations that are too high. The net effect is that measured deep resistivity ($R_t$) values are too low, and computed water saturations ($S_w$) are too high.

Figure 2:
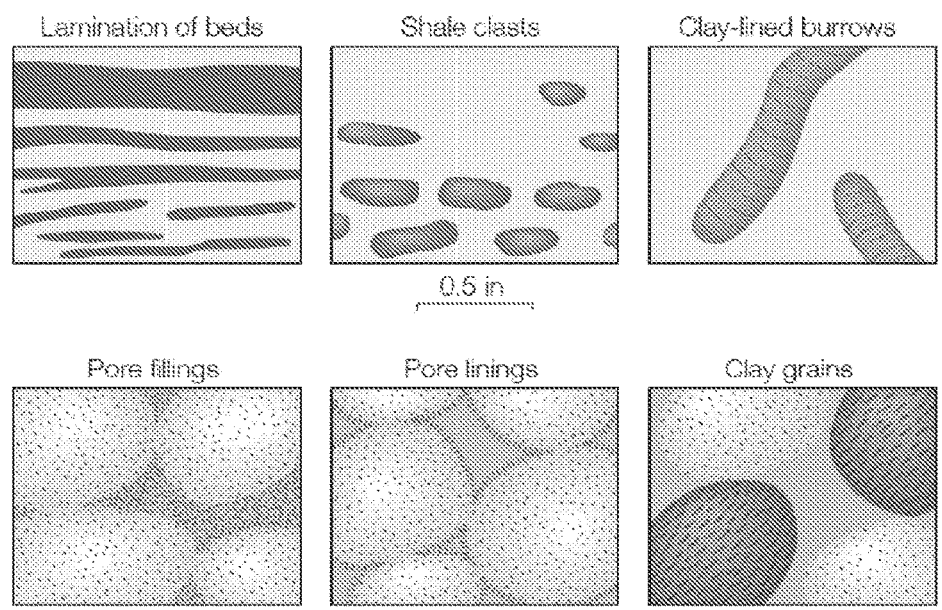
FIG. 2 illustrates clays which, combined with bound water, are the primary cause of low-resistivity pay in sandstones and shales.

Microporosity also occurs in sandstones and shales, commonly related to the presence of clays. With particular respect to FIG. 2, clays, combined with bound water, are illustrated that are the primary cause of low-resistivity pay in sandstones and shales. Clays can form after deposition. They may be distributed in a formation as laminar shales, shale clasts, and/or clay-lined burrows (top). Clays can occur as dispersed pore fillings, pore linings, and discrete grains. Clays may affect resistivity logs by providing conductive paths for electrical current, thereby yielding measured deep resistivity ($R_t$) values that are too low and computed water saturations ($S_w$) that are too high compared to the values normally expected for hydrocarbon-bearing formations.

Saturation Evaluation

Saturation evaluation involves determining the uninvaded-zone saturation, $S_w$, and the flushed-zone saturation, $S_{xo}$. When combined, these terms can be used to estimate the amount of movable hydrocarbons in the reservoir. In accordance with Archie's law, the water saturation may be calculated by Equation 1 shown below $$S_w = \left(\frac{R_o}{R_t}\right)^{\frac{1}{n}} = \left(\frac{FR_w}{R_t}\right)^{\frac{1}{n}} = \left(\frac{aR_w}{\phi^m R_t}\right)^{\frac{1}{n}} \quad (1)$$

where $S_w$ is water saturation, n is the saturation exponent, $R_o$ is the resistivity of the rock-water system when the rock is 100% filled with water, $R_t$ is the resistivity of the rock-water-hydrocarbon system for rocks partially saturated with water and hydrocarbons, F is the formation factor, $R_w$ is the resistivity of the water, a is the tortuosity factor, $\phi$ is the fractional porosity, and m is the cementation exponent.

Porosity and deep resistivity ($R_t$) may be determined in some embodiments using conventional log analysis. One approach to determine $R_w$ may utilize a spontaneous potential (SP) log, provided that the formation temperature and mud-filtrate resistivity ($R_{mf}$) are known. Another approach is to determine $R_w$ from porosity and resistivity logs in a wet zone where $S_w=1$, so $R_o=R_t$. This assumes the same water occurs in the hydrocarbon-bearing zone. Finally, $R_w$ can be determined from chemical analysis of produced water, with results provided by the client or from a water catalog for the appropriate reservoir. Note that resistivities may be sensitive to temperature and therefore values may be corrected in some embodiments to account for reservoir temperature before reliable calculations can be made.

For typical non-shaly rocks, a=1, m=2, and n=2. Using these values, the Archie equation becomes:

$$S_w = \left(\frac{R_w}{\phi^2 R_t}\right)^{\frac{1}{2}} \quad (2)$$

In sandstones, some petrophysicists use m=2.15, n=2, a=0.62. With these values, the Archie equation becomes:

$$S_w = \left(\frac{0.62 R_w}{\varphi^{2.15} R_t}\right)^{\frac{1}{2}} \quad (3)$$

For the invaded zone in non-shaly rocks, the Archie equation can be written as:

$$S_{xo} = \left(\frac{R_{mf}}{\phi^2 R_{xo}}\right)^{\frac{1}{2}} \quad (4)$$

where $S_{xo}$ is water saturation in the invaded zone, $R_{mf}$ is resistivity of the mud filtrate, $\phi$ is fractional porosity, and $R_{xo}$ is resistivity of the rock-water-hydrocarbon system in the invaded zone.

Saturation-Height Function

Figure 3:
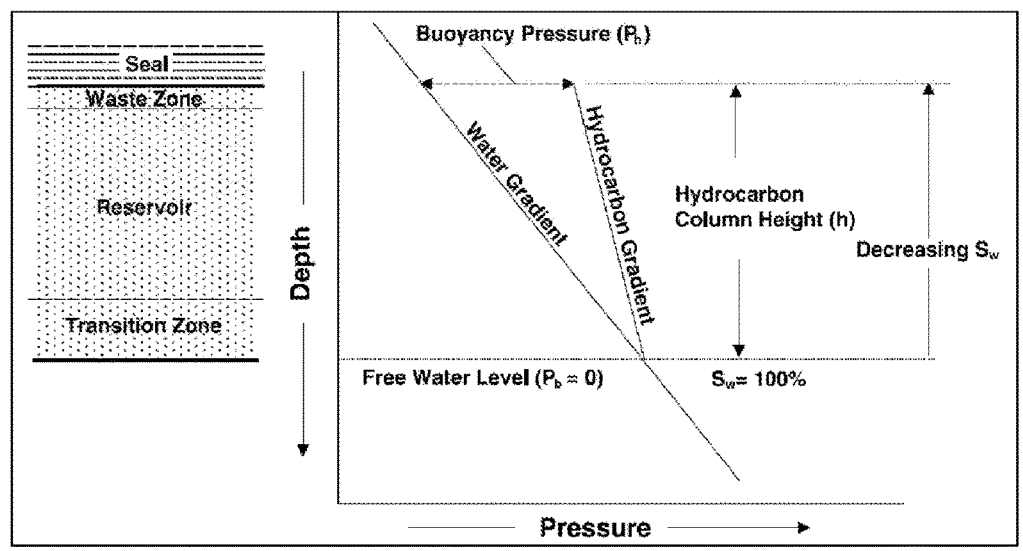
FIG. 3 illustrates a definition of free water level at which buoyancy pressure, Pb=0.

The free water level (FWL) is the depth at which capillary pressure is zero, or there is zero buoyancy pressure. With particular respect to FIG. 3, a definition of free water level is illustrated at which buoyancy pressure, Pb=0.

In some embodiments, it is possible to use mercury injection capillary pressure (MICP) data to calculate saturation as a function of height above the FWL. Using MICP, the height of the hydrocarbon column may be determined according to Equation 5 shown below:

$$h = \frac{P_{c,\frac{h}{w}}}{(\rho_w - \rho_h) 0.433} \quad (5)$$

where h is height of the hydrocarbon column in ft; $P_{c,h/w}$ is capillary pressure of the hydrocarbon/water/solid system in psi; $\rho_w$ is water density in g/cm³; $\rho_h$ is hydrocarbon density in g/cm³; and 0.433 is a conversion factor.

Because capillary pressure is commonly measured using an air/mercury/solid system, rather than a hydrocarbon/water/solid system, the following conversion may be used:

$$P_{c,\frac{h}{w}} = P_{c,\frac{a}{Hg}} \left(\frac{\sigma_{\frac{h}{w}} \cos\theta_{\frac{h}{w}}}{\sigma_{\frac{a}{Hg}} \cos\theta_{\frac{a}{Hg}}}\right) \quad (6)$$

where $P_{c,h/w}$ is previously defined; $P_{c,a/Hg}$ is capillary pressure of the air/mercury/solid system in psi; $\sigma_{h/w}$ is the hydrocarbon/water interfacial tension in dynes/cm; $\theta_{h/w}$ is the hydrocarbon/water contact angle, a commonly used value is 0° for water wet systems; $\sigma_{a/Hg}$ is the air/mercury interfacial tension, a commonly used value is 480 dynes/cm; and $\theta_{a/Hg}$ is the air/mercury contact angle, a commonly used value is 140°. For reservoir calculations, values of fluid density and interfacial tension in Equations (5) and (6) may be corrected for subsurface temperature and pressure in some embodiments.

For example, substituting equation (6) into equation (5) yields the following:

$$h = \frac{P_{c,\frac{a}{Hg}} \left(\frac{\sigma_h \cos\theta_h}{\sigma_{\frac{a}{Hg}} \cos\theta_{\frac{a}{Hg}}}\right)}{(\rho_w - \rho_h) 0.433} \quad (7)$$

Based upon the principles outlined by Thomeer, the equation may also be rewritten as:

$$B_v = B_{v,\infty} \cdot \exp\left[\frac{-G}{\log(P_c) - \log(P_d)}\right] \text{ for} \quad (8)$$

$P_c > P_d$; otherwise 0 where $B_v$ is bulk volume occupied by mercury in a capillary pressure experiment; $B_{v,\infty}$ is the percent bulk volume occupied by mercury at infinite applied pressure; G is the pore geometrical factor that determines the shape of the resulting Thomeer hyperbola; $P_c$ is the capillary pressure; and $P_d$ is the displacement pressure used to first intrude mercury into the largest pore-throat of a family of pores.

If i=the number of pore families, the equation may be written as:

$$B_v = \sum_i B_{v,\infty i} \cdot \exp\left[\frac{-G_i}{\log(P_c) - \log(P_{d,i})}\right] \text{ for} \quad (9)$$

$P_c > P_{d,i}$; otherwise 0 where mercury saturation ($S_{Hg}$) can be computed by dividing bulk volume by porosity, $\phi$:

$$S_{Hg} = B_v / \phi \quad (10)$$

If the irreducible oil saturation ($S_{o,irr}$) is not equal to zero, oil saturation can be approximated by:

$$S_o = S_{Hg} + S_{o,irr} \quad (11)$$

Water saturation ($S_w$) may then be computed by subtracting oil saturation from 1:

$$S_w = 1 - S_o \quad (12)$$

Figure 4:
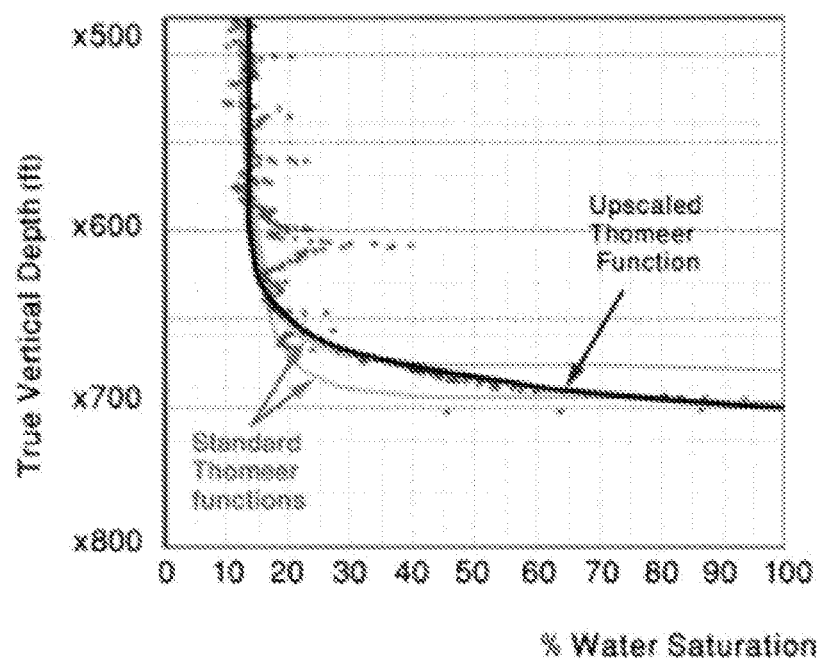
FIG. 4 illustrates the percent water saturation vs. true vertical depth in a Thomeer curve obtained from MICP data.

By using a combination of Thomeer analyses for typical lithologies and equations (7) and (12), it is possible to model the variation of water saturation as a function of height above the free water level. With particular respect to FIG. 4, the percent water saturation vs. true vertical depth is illustrated. In FIG. 4, a well intersects the field's transition zone. The transition-zone data are not well represented by the standard Thomeer hyperbolas (light grey), but represented better by a longer and more-gradual transition-zone trend given by the upscaled version of the Thomeer function (black).

Methods described herein may integrate at least one of thin sections, core samples, standard openhole logs, nuclear magnetic resonance (NMR) logs, and borehole image logs to create a corrected saturation-height function that quantifies microporosity, in order to provide more accurate water-saturation calculations.

In one or more embodiments, a saturation-height function for a subterranean formation may be determined by quantifying the microporosity of the subterranean formation from one or more core samples; determining the distribution of facies and microporosity as a function of depth; and calculating the saturation-height function.

Methods disclosed herein may create a saturation-height function by: quantitatively measuring microporosity, using techniques such as laser scanning confocal microscopy and/or MICP data; determining the distribution of facies and microporosity as a function of depth using techniques such as conventional openhole logs, core, borehole images, nuclear magnetic resonance (NMR) logs, and analysis of sequential core samples using confocal microscopy and/or MICP; and evaluating the effect of microporosity on water saturation ($S_w$) and determine saturation-height functions, to improve original gas- and oil-in-place determinations.

The porosity data generated from the above techniques may be used in conjunction with a number of logging techniques to decrease the uncertainty from the use of various porosity assumptions and account for structural variations and facies in the formation. For example, the water saturation and height above free water can be calculated from resistivity or other wireline logs and then compared to the corresponding laboratory core measurement of capillary pressure. The combination of these methods may provide confirmation of the reliability of the analysis.

In other embodiments, techniques that quantify porosity directly such as confocal microscopy or MICP may be used to characterize a core sample or series of core samples from a given wellbore and the resulting data may be compiled to generate a description of the microporosity as a function of depth, which may then be used to determine the saturation-height function.

In one or more embodiments, NMR tools may generate continuous well logs once emplaced within a given formation. Measurements obtained from an NMR tool (such as $T_1$, $T_2$, $T_1/T_2$, and D) are proportional to the density of nuclear spins (i.e., protons) present in a given interval of the wellbore or sample. In addition, the NMR transverse relaxation time distribution (T2 distribution) is largely related to pore-body size distribution in the rock sample, and to a lesser degree factors such as surface relaxivity and fluid type. The NMR logs obtained are therefore a measure of the porosity downhole, and may be converted to a NMR porosity log, by comparing the measured response for each fluid with the calibrated 100% porosity.

In standard practice, the NMR tools have been calibrated to 100% porosity with water at the surface, whose hydrogen index is assigned a value of one. However, NMR porosity logs in accordance with the present disclosure may be calibrated with porosity data obtained from other characterization methods such as porosity measurements from thin sections using traditional microscopy, confocal microscopy, MICP, or borehole imaging, for example.

Confocal microscopy techniques used in accordance with the present disclosure use point illumination and a pinhole placed in front of a detector to remove out-of-focus light. Because each measurement is a single point, confocal devices perform scans along grids of parallel lines to provide 2D images of sequential planes at specified depths within a sample.

The information generated from confocal microscopy may be used to determine a number of factors. In one example, confocal microscopy may allow for the opportunity to compute pore-size distribution independently from conventional approaches, such as mercury-injection capillary pressure (MICP) and nuclear magnetic resonance (NMR). Other examples may include the use of confocal profilometry as an independent way to determine S/V (surface area/volume) ratios for pores. Finally, by using multi-point statistical models (MPS) and confocal profilometry, it is possible to generate realistic 3D digital rock models suitable for flow simulation, either in their original form or after conversion to pore-network models.

In another example, workflows in accordance with embodiments disclosed herein may include quantitatively measuring microporosity using laser scanning confocal microscopy and MICP data; determining the distribution of facies and microporosity as a function of depth using at least one of conventional openhole logs, core, borehole images, or nuclear magnetic resonance (NMR) logs; and evaluating the effect of microporosity on water saturation ($S_w$) and determine saturation-height functions, to improve original gas- and oil-in-place determinations.

MICP techniques in accordance with the present disclosure may be used to determine capillary pressure in some embodiments. Capillary pressure is dependent on a number of factors including individual pore sizes, pore throat size, the interfacial tension of water and oil phases, and wettability of the formation.

Briefly, during MICP testing, a nonwetting phase of mercury is injected into a sample of rock at high pressure, and the cumulative volume of mercury injected at each pressure is recorded as a measure of the nonwetting-phase saturation. At each increased pressure step, pore throats of a particular size are invaded by mercury. Mercury continues to invade all pore bodies connected to the outside of the core plug and pore throats of similar size. As illustrated in FIG. 4, mercury capillary pressure curves may be used to estimate displacement pressures, irreducible water saturations, the thickness of the hydrocarbon-water transition zone, and permeability.

Figure 5:
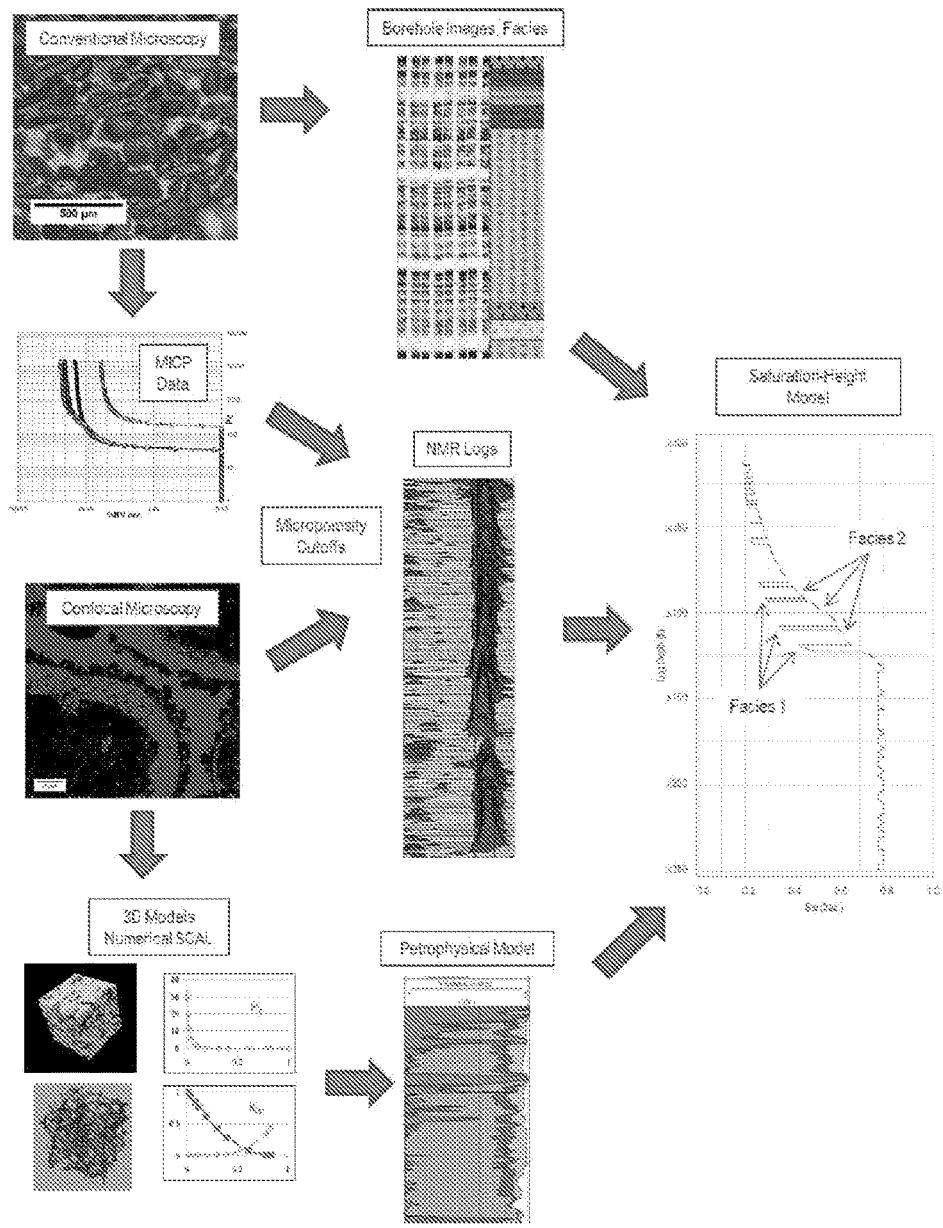
FIG. 5 illustrates a graphical display of a rock and log based method used to interpret a saturation-height model.

With particular reference to FIG. 5, a graphical display is provided that gives a general overview of workflows of a rock-based and well log-based methods that may be used to interpret a saturation-height model. Abbreviations used in the following figure include MICP=mercury injection capillary pressure; SCAL=special core analysis; Pc=capillary pressure; krel=relative permeability; NMR=nuclear magnetic resonance; $S_w$=water saturation; frac.=fraction; ft=feet.

Figure 6:
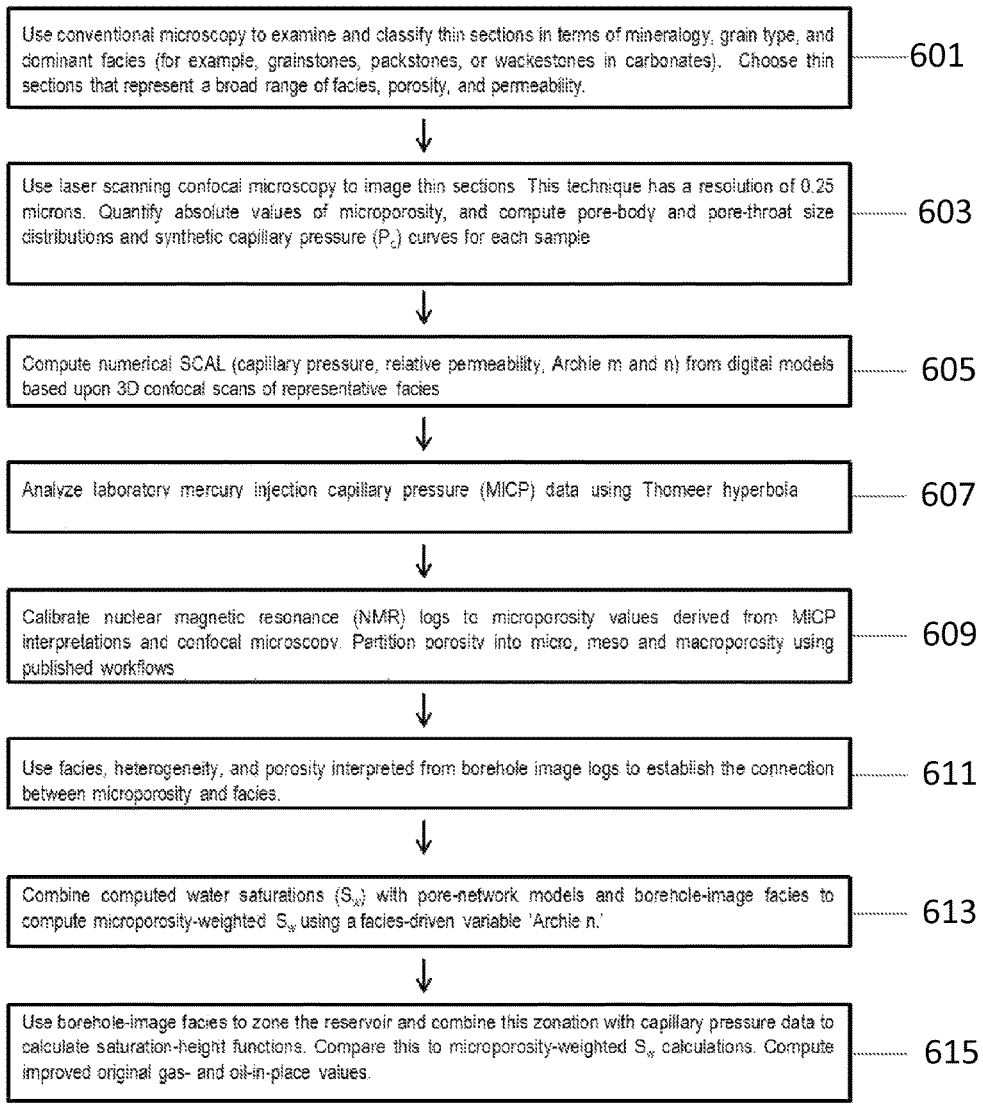
FIG. 6 illustrates a flow diagram showing a rock- and log-based method used to interpret a saturation-height model.

FIG. 6 illustrates a flow diagram showing one embodiment of a rock- and log-based workflow used to interpret a saturation-height model. The flow diagrams in FIGS. 5 and 6 illustrate the architecture, functionality, and operation of possible implementations of methods in accordance with the instant disclosure. Further, in some alternative embodiments, the operations noted in a given block of the flow diagram may occur out of the order noted in the figures. For example, two blocks shown in succession may, in fact, be executed substantially concurrently, or the blocks may sometimes be executed in the reverse order, depending upon the nature of the operations involved.

In the particular embodiment shown in FIG. 6, methods may include the following processes. In a first process (601), conventional microscopy may be used to examine and classify thin sections of core samples retrieved from a given formation in terms of mineralogy, grain type, and dominant facies (for example, in carbonates the facies may be grainstones, packstones, or wackestones). Thin sections may be chosen for further analyses that represent a broad range of facies, porosity, and permeability.

In a second process (603), laser scanning confocal microscopy may be used to image thin sections or core samples. This technique may have a resolution of about 0.25 microns in some embodiments. During imaging, confocal microscopy may be used to quantify absolute values of microporosity, pore-body distributions, and pore-throat size distributions, and synthetic capillary pressure ($P_c$) curves for each sample may be computed.

In a third process (605), special core analysis (SCAL) may be computed from digital models based upon 3D confocal scans of representative facies. In one or more embodiments, SCAL may determine at least one variable that may include capillary pressure, relative permeability, and Archie m and n exponents.

In a fourth process (607), laboratory MCIP data for core plugs from various wells may be analyzed using Thomeer hyperbola.

In a fifth process (609), nuclear magnetic resonance (NMR) logs may be calibrated to microporosity values derived from MICP interpretations and/or confocal microscopy. In some embodiments, porosity may be partitioned into microporosity, mesoporosity, and macroporosity. Continuous logs of microporosity vs. depth may then be generated.

In a sixth process (611), facies, heterogeneity, and porosity interpreted from at least one of microscopy, microporosity data, and wellbore logs such as NMR logs or borehole image logs may be used to divide the wellbore into zones distinguished on the basis of the correlation of microporosity and facies, for example.

In a seventh process (613), water saturations ($S_w$) may be derived from an openhole-log based lithology model combined with at least one pore-network model and/or borehole-image facies to compute microporosity-weighted $S_w$ using a facies-driven variable, the Archie saturation exponent (Archie n). In an example where Archie m=2.08 and Archie n=0.93, microporosity-weighted $S_w$ is computed using the following equation 13 shown below.

$$\text{Weighted average } S_w = S_{w(m=2.08, n=0.93)} \times \text{Fraction of Microporosity} + S_{w(m=2.00, n=2.00)} \times \text{Fraction of Macroporosity} \quad (13)$$

Finally, in an eighth process (613), borehole-image facies may be used to zone the reservoir and combine this zonation with capillary pressure data to calculate saturation-height functions, which may then be compared to microporosity-weighted $S_w$ calculations. The improved original gas- and oil-in-place values may then be computed.

While a number of formation characterization techniques are described in the present disclosure, methods may utilize complementary or overlapping techniques to increase the accuracy of the variables used to determine the saturation-height function. Conversely, depending on the needs of the operator with regards to time and/or expense, methods described herein may be used to generate a saturation-height function from only a subset of the described techniques.

Example

In the following embodiment, confocal microscopy is used to provide an objective, quantitative measurement of microporosity, which may be more accurate than point-counting methods. Confocal microscopy is based on interactions between laser light and fluorescent-dyed epoxy. During sample preparation, vacuum-pressure impregnation was used to drive a florescent-dyed epoxy into the pores of the given rock sample. Confocal images were then captured by scanning the sample in a grid pattern and recording images point by point. The presence of fluorescent epoxy in micropores is evidence that the micropores are effective, and they have a high degree of 3D connectivity.

In an unpublished case study in a carbonate reservoir, a low amount of microporosity (approximately 15% of total porosity) occurs in grainstones, whereas burrowed, heterogeneous packstones and wackestones have 40 to 70% microporosity. Stylolite-cemented zones, commonly associated with grainstones, either have very low total porosity, or very low amounts of microporosity. Pore-network modeling showed that the microporosity fraction influences Archie n and $S_w$. This observation is important in reserves calculations, and is used to help compute saturation-height functions.

MICP interpretations identified micropore and macropore families and determined the maximum pore-throat size corresponding to entry pressure ($P_d$) for each particular pore system. MICP results were then used to partition total porosity into subordinate pore systems, such as micropores and macropores.

NMR-based log interpretation produced calibrated microporosity and macroporosity logs vs. depth, providing an objective, continuous evaluation of the microporosity fraction.

Confocal microscopy and pore-network modeling showed that the assumed Archie m=2 and n=2 values were not appropriate for microporous rocks in this study. The microporous rocks appeared to have lower "n" values, approximately equal to 1, which lead to lower computed water saturations in the reservoir.

In a well with the most complete dataset (borehole image log with facies determination, MICP results, conventional petrography, confocal microscopy, pore-network modeling, and NMR log interpreted for microporosity), the microporosity vs. depth curve was used to compute a linear interpolation of water saturations solved using different Archie parameters.

The microporosity-weighted $S_w$ curve showed decreased water saturations, with a reduction on the order of 20-40% in the most porous intervals. If assumptions are correct, this implies higher original oil in place in these intervals than normal Archie saturations (m=2; n=2) would compute.

This subject disclosure is an integrated method used to compute the saturation-height function based on capillary pressure, confocal petrography, and formation micro imager (FMI) facies zonation. An excellent match between MICP-based and resistivity-based results suggests the ability to correctly calculate water-saturation in low-resistivity pay. The observed reduced water saturation may have an impact on volumetrics and original oil in place in the full-field static model.

Embodiments described herein may be advantageous over techniques that assume homogenous porosity throughout a given well through a formation. Widespread application of this workflow could potentially lead to calculations of decreased water saturations and increased original gas- and oil-in-place (OGIP, OOIP) values in low-resistivity pay in reservoirs throughout the world.

Some of the methods and processes described above, can be performed by a processor. The term "processor" should not be construed to limit the embodiments disclosed herein to any particular device type or system. The processor may include a computer system. The computer system may also include a computer processor (e.g., a microprocessor, microcontroller, digital signal processor, or general purpose computer) for executing any of the methods and processes described above.

The computer system may further include a memory such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device.

Some of the methods and processes described above, can be implemented as computer program logic for use with the computer processor. The computer program logic may be embodied in various forms, including a source code form or a computer executable form. Source code may include a series of computer program instructions in a variety of programming languages (e.g., an object code, an assembly language, or a high-level language such as C, C++, or JAVA). Such computer instructions can be stored in a non-transitory computer readable medium (e.g., memory) and executed by the computer processor. The computer instructions may be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

Alternatively or additionally, the processor may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Any of the methods and processes described above can be implemented using such logic devices.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims. Moreover, embodiments described herein may be practiced in the absence of any element that is not specifically disclosed herein.

In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed:

1. A method for determining a saturation-height function for a subterranean formation comprising:
   obtaining at least one core sample of the subterranean formation;
   analyzing the at least one core sample to quantify absolute values of microporosity of the subterranean formation;
   determining a distribution of facies and microporosity as a function of depth based on the quantified absolute values of microporosity of the subterranean formation;
   calculating, a saturation-height function based on the distribution of facies and microporosity as a function of depth; and
   using the distribution of facies and microporosity as a function of depth to establish a correlation between microporosity and facies of the subterranean formation.

2. The method of claim 1, wherein quantifying the absolute values of microporosity comprises using laser scanning confocal microscopy to quantify absolute values of at least one of microporosity, pore-body size distributions, pore-throat size distributions, or synthetic capillary pressure curves for the one or more core samples.

3. The method of claim 2, further comprising using confocal microscopy to generate a three dimensional pore-network model from the one or more core samples.

4. The method of claim 1, further comprising using microscopy to determine at least one facies for the one or more core samples.

5. The method of claim 1, further comprising determining a capillary pressure using mercury injection capillary pressure analysis.

6. The method of claim 5, wherein the mercury injection capillary pressure is analyzed using Thomeer hyperbola.

7. The method of claim 1, wherein determining the distribution of facies and microporosity as a function of depth comprises using a well logging technique selected from at least one of conventional openhole logs, core logs, borehole imaging logs, or nuclear magnetic resonance logs.

8. The method of claim 7, wherein the saturation height-function is calculated by combining the microporosity determined from the one or more core samples with the distribution of facies and microporosity as a function of depth obtained from the well logging technique selected from at least one of conventional openhole logs, core logs, borehole imaging logs, or nuclear magnetic resonance logs.

9. The method of claim 8, further comprising determining an Archie saturation exponent (n) to compute a microporosity-weighted water saturation.

10. The method of claim 1, wherein the distribution of facies and microporosity is used to zone the subterranean formation.

11. The method of claim 1, further comprising determining one or more properties selected from a group consisting of porosities, permeabilities, capillary pressures, resistivity indices, relative permeabilities, water saturations, irreducible water saturations, residual oil saturations, recovery factors, Archie cementation (m) exponents, or Archie saturation (n) exponents.

12. The method of claim 1, wherein the subterranean formation includes one or more types of lithologies selected from a group consisting of carbonates, sandstones shales, coals, evaporites, igneous, and metamorphic rocks.

13. A method for determining a saturation-height function for a subterranean formation comprising:
   obtaining at least one core sample of the subterranean formation;
   classifying at least one core sample in terms of variation in at least one of facies, porosity, and permeability;
   analyzing the at least core sample to quantify at least one of absolute values of microporosity, pore-body size distributions, pore-throat size distributions, or synthetic capillary pressure curves;
   computing a numerical special core analysis from a digital model generated from the at least one of absolute values of microporosity, pore-body size distributions, pore-throat size distributions, and synthetic capillary pressure curves;
   obtaining at least one mercury injection capillary pressure measurement from the at least one core sample;
   analyzing the at least one mercury injection capillary pressure measurement using Thomeer hyperbola;
   obtaining at least one nuclear magnetic resonance log for the subterranean measurement;
   calibrating the at least one nuclear magnetic resonance log using porosity values determined from the analysis of the at least one core sample and the at least one mercury injection capillary pressure measurement;

determining a microporosity-weighted water saturation; and calculating the saturation height of the subterranean formation.

14. The method of claim 13, wherein quantifying at least one of absolute values of microporosity, pore-body size distributions, pore-throat size distributions, or synthetic capillary pressure curves comprises using laser scanning confocal microscopy to image the at least one core sample.

15. The method of claim 13, wherein computing the numerical special core analysis from a digital model comprises generating the digital model from confocal microscopy of the at least one core sample.

16. The method of claim 13, wherein computing the numerical special core analysis comprises determining at least one of capillary pressure, relative permeability, or Archie m and n numbers.

17. The method of claim 13, wherein calibrating the at least one nuclear magnetic resonance log using porosity values comprises partitioning the porosity values into at least one of microporosity, mesoporosity, or microporosity.

18. The method of claim 13, wherein the microporosity-weighted water saturation is determined using an Archie saturation exponent (n) value to combine at least one computed water saturation value with a pore-network model and at least one borehole-image facies.

19. The method of claim 13, wherein calculating the saturation height of the subterranean formation comprises using borehole-image facies to zone the reservoir and using capillary pressure data to calculate a saturation-height function.

* * * * *